United States Patent
Puskarich

(10) Patent No.: US 9,332,099 B2
(45) Date of Patent: *May 3, 2016

(54) WIRELESS DEVICE NETWORKS WITH SMOKE DETECTION CAPABILITIES

(71) Applicant: Apple Inc., Cupertino, CA (US)

(72) Inventor: Paul G. Puskarich, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,021

(22) Filed: Nov. 17, 2015

(65) Prior Publication Data

US 2016/0072935 A1    Mar. 10, 2016

Related U.S. Application Data

(63) Continuation of application No. 14/805,222, filed on Jul. 21, 2015, now Pat. No. 9,218,731, which is a continuation of application No. 13/897,910, filed on May 20, 2013, now Pat. No. 9,123,221.

(51) Int. Cl.
*G08B 1/08*    (2006.01)
*H04M 1/21*    (2006.01)
(Continued)

(52) U.S. Cl.
CPC ............... *H04M 1/21* (2013.01); *G08B 17/10* (2013.01); *H04M 1/72538* (2013.01)

(58) Field of Classification Search
CPC .. G08B 25/009; G08B 27/006; G08B 27/001; G08B 13/19684; G08B 17/107; G08B 21/0283; G08B 25/016; H04M 2250/12; H04M 1/72569; H04M 1/72572; H04M 11/04; H04M 1/72536; H04M 2242/04; H04M 2250/10; H04M 1/21; H04M 1/72538
See application file for complete search history.

(56) References Cited

U.S. PATENT DOCUMENTS 4,319,234 A    3/1982    Rice
4,471,346 A    9/1984    Nelson et al.
(Continued)

FOREIGN PATENT DOCUMENTS

WO    03023729    3/2003
WO    2006026025    3/2006

OTHER PUBLICATIONS

Ahrens, "Smoke Alarms in U.S. Home Fires" National Fire Protection Association, Sep. 2011.
(Continued)

*Primary Examiner* — Kerri McNally
*Assistant Examiner* — Renee Dorsey
(74) *Attorney, Agent, or Firm* — Treyz Law Group, P.C.; G. Victor Treyz; Joseph F. Guihan

(57) ABSTRACT

An electronic device may include a smoke detector. The electronic device may use the smoke detector to monitor for the presence of smoke. In response to detecting smoke with the smoke detector, the electronic device may issue an alert or take other suitable action. The electronic device may transmit alerts to nearby electronic devices and to remote electronic devices such as electronic devices at emergency services facilities. Alerts may contain maps and graphical representations of buildings in which smoke has been detected. Motion detectors and other sensors and circuitry may be used in determining whether electronic devices are being used by users and may be used in determining where the electronic devices are located. Alerts may contain information on the location of detected smoke and building occupants.

20 Claims, 17 Drawing Sheets

(51) Int. Cl.
*H04M 1/725* (2006.01)
*G08B 17/10* (2006.01)

(56) References Cited

U.S. PATENT DOCUMENTS

| | | |
|---|---|---|
| 4,525,703 A | 6/1985 | Bellino |
| 5,283,816 A | 2/1994 | Gomez |
| 5,382,341 A | 1/1995 | Aroutiounian et al. |
| 5,745,849 A | 4/1998 | Britton |
| 5,867,105 A | 2/1999 | Hajel |
| 6,624,750 B1 | 9/2003 | Marman et al. |
| 7,904,041 B2 | 3/2011 | Feher |
| 8,258,969 B1 | 9/2012 | Billman |
| 2005/0101250 A1 | 5/2005 | Helal et al. |
| 2006/0164241 A1 | 7/2006 | Makela et al. |
| 2006/0223547 A1 | 10/2006 | Chin et al. |
| 2007/0008104 A1 | 1/2007 | McBain |
| 2007/0132733 A1* | 6/2007 | Ram ............... G06F 3/0227 345/163 |
| 2007/0194906 A1 | 8/2007 | Sink |
| 2008/0058615 A1 | 3/2008 | Clapp et al. |
| 2008/0151056 A1 | 6/2008 | Ahamefula |
| 2009/0237239 A1 | 9/2009 | McSheffery |
| 2010/0297981 A1 | 11/2010 | Ballantyne et al. |
| 2011/0024640 A1 | 2/2011 | Kahilainen et al. |
| 2011/0066374 A1 | 3/2011 | Hartman et al. |
| 2014/0108004 A1 | 4/2014 | Sternby et al. |

OTHER PUBLICATIONS

"Smoke Alarms in Reported U.S. Home Fires" National Fire Protection Association, 2011 [Retrieved on May 28, 2013] Retrieved from the Internet <URL:www.nfpa.org/assets/files/PDF/SmokeAlarmsFactSheet.pdf>.

* cited by examiner ame
WIRELESS DEVICE NETWORKS WITH SMOKE DETECTION CAPABILITIES This application claims priority to U.S. patent application Ser. No. 14/805,222, filed Jul. 21, 2015, which claims priority to U.S. patent application Ser. No. 13/897,910, filed May 20, 2013, now U.S. Pat. No. 9,123,221, both of which are hereby incorporated by reference herein in their entireties. This application claims the benefit of and claims priority to U.S. patent application Ser. No. 14/805,222, filed Jul. 21, 2015, and U.S. patent application Ser. No. 13/897,910, filed May 20, 2013, now U.S. Pat. No. 9,123,221.

BACKGROUND

This relates generally to electronic devices, and more particularly, to using networked electronic devices to detect smoke associated with fires.

Fires are a serious threat to the occupants of residential and commercial buildings. Smoke detectors are widely used to combat the risks associated with fires. Smoke detectors are generally mounted at fixed locations within a building. A building occupant who is located in a portion of a building that is remote from fixed smoke detector locations may be out of range of smoke detector coverage and may have difficulty hearing audible alarms generated by the smoke detectors. Smoke detector alarms are typically limited in scope and do not include information of interest to first responders and neighbors such as information on current building occupants.

It would therefore be desirable to be able to provide systems with improved smoke detection and alert capabilities.

SUMMARY

An electronic device such as a cellular telephone, computer, or other electronic equipment may include a smoke detector. The electronic device may use the smoke detector to monitor for the presence of smoke. In response to detecting smoke with the smoke detector, the electronic device may issue an alert or take other suitable action. For example, the electronic device may activate fire suppression equipment, may transmit a text or email message, may transmit alerts to other electronic devices, may generate audible alerts, etc.

Using wired and wireless communications circuitry, the electronic device may transmit alerts to nearby electronic devices and to remote electronic devices such as electronic devices at emergency services facilities. Alerts may contain maps and graphical representations of buildings in which smoke has been detected.

Motion detectors and other sensors and circuitry may be used in determining whether electronic devices are being used by users and may be used in determining where the electronic devices are located. Alerts may contain information on the location of detected smoke and building occupants.

Further features of the invention, its nature and various advantages will be more apparent from the accompanying drawings and the following detailed description of the preferred embodiments.

DETAILED DESCRIPTION

Electronic devices may be provided with smoke detectors that allow the electronic devices to monitor a building or other structure for the presence of smoke. If smoke is detected, there is a risk that the building is on fire. Accordingly, the user of an electronic device that detects smoke, emergency services personnel, building occupants, neighbors, and others may be notified in response to detection of smoke. Sprinkler systems and other fire suppression equipment may also be activated in response to the detection of smoke. The electronic devices may be used in sending alerts, issuing commands to fire suppression equipment, and taking other actions.

Figure 1:
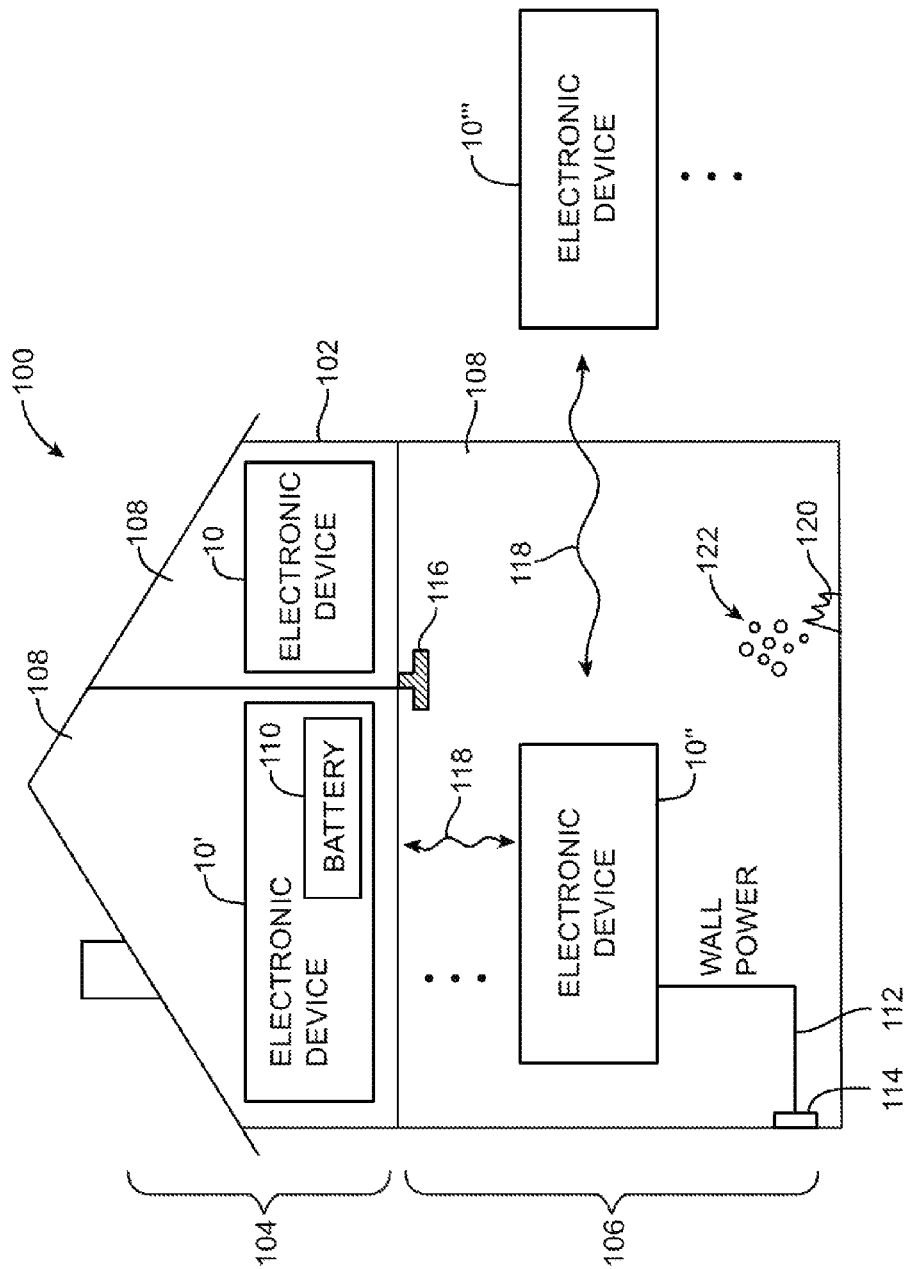
FIG. 1 is a diagram of a system in which a network of electronic devices may be used to monitor for the presence of smoke in the surrounding environment and may be used to take actions such as issuing alerts or controlling fire suppression equipment in accordance with an embodiment of the present invention.

An illustrative system such as system 100 of FIG. 1 may be used in monitoring for smoke and taking action in response to the detection of smoke. As shown in FIG. 1, system 100 may contain multiple electronic devices 10. Electronic devices 10 may be coupled by a communications network including communications paths 118 to form a network of two or more electronic devices. Communications paths 118 may include wired paths (e.g., paths that pass through the internet, paths that pass through local area network equipment, and paths that pass through other networks) and may include wireless paths (e.g., cellular telephone network paths, wireless local area network paths, etc.).

Electronic devices 10 may run on battery power and/or line power from a wall outlet. As shown in FIG. 1, for example, electronic device 10' may be powered by battery 110. Electronic device 10'' may be powered by wall power received over power cable 112 from wall outlet 114. If desired, electronic devices 10 (e.g., devices 10, 10', 10'', and 10''' of FIG. 1) may contain both batteries and power regulator circuitry for receiving alternating current (AC) power from a wall outlet or other source of AC power.

Electronic devices 10 may include portable electronic devices and stationary electronic devices. Devices 10 may be located inside buildings such as building 102 and may be located outside buildings such as building 102 (see, e.g., external electronic device 10''').

Building 102 may have one or more stories, two or more stories, or ten or more stories (as examples). In the example of FIG. 1, building 102 has lower floor 106 and upper floor 104. This is merely illustrative. Buildings such as building 102 of FIG. 1 may have any suitable number of floors.

As shown in FIG. 1, buildings such as building 102 may include fire suppression equipment 116. Fire suppression equipment 116 may include sprinkler systems, chemical fire suppressor dispensing systems, and other fire suppression systems. The fire suppression equipment may be activated by wired-path or wireless control signals that are supplied by one or more of electronic devices 10.

Building 102 may contain multiple rooms 108. There may be any suitable number of devices 10 in each room 108 (e.g., no devices, one device, multiple devices, etc.). There may also be any suitable number of devices 10 outside of building 102 (e.g., no devices, one device such as device 10''', multiple devices, etc.).

Fires such as fire 120 may be started by accident within building 102, producing smoke 122. One or more of electronic devices 10 may contain smoke detector equipment to monitor for the presence of smoke 122. In response to detection of smoke 122 by the smoke detector in one of devices 10, that device 10 may issue alerts using the hardware of that device, may issue alerts by broadcasting or otherwise communicating alerts using other devices 10 in the network of system 100, may issue control commands to fire suppression equipment 116 that directs fire suppression equipment 116 to emit water or other fire suppression substances, or may take other suitable actions to help protect the occupants of building 102 and others.

Figure 2:
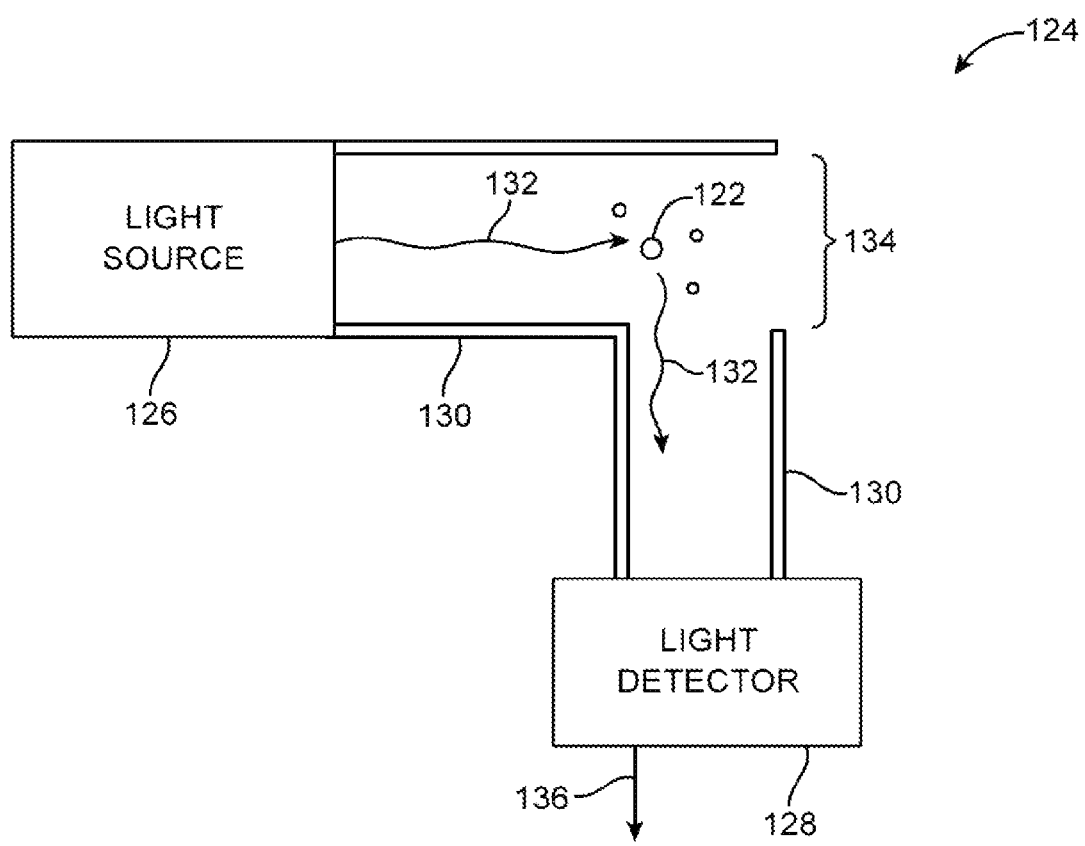
FIG. 2 is a diagram of an illustrative light-based smoke detector of the type that may be used in an electronic device in accordance with an embodiment of the present invention.

FIG. 2 is a diagram of an illustrative light-based smoke detector of the type that may be used in electronic devices 10. As shown in FIG. 2, smoke detector 124 may include a light source such as light source 126 and a light detector such as light detector 128. Baffle structure 130 may be used to block light 132 that is emitted from light source 126, so that light 132 does not directly reach light detector 128. Baffle structures 130 may have an opening such as opening 134 that allows particles of smoke 122 to enter the interior of baffle structures 130 in alignment with the output of light source 126. During operation, light source 126 emits light 132. In the absence of smoke 122, light 132 will exit opening 134 and will not be detected by light detector 128. In the presence of smoke 122, light 132 will be illuminate smoke particles 122. Light 132 that is deflected by the illuminated smoke particles 122 may pass through the interior of baffle structures 130 to light detector 128. The output of light detector 128 on path 136 will be proportional to the amount of smoke 122 that is present. When little or no smoke 122 is present in baffle 130, light detector 128 may produce a signal on output 136 indicating that smoke 122 (and therefore fire) are absent from building 102. When smoke 122 is present, light 132 of more than a threshold amount will be reflected into light detector 128. In response, light detector 128 may generate an output signal on output 136 that indicates that smoke 122 (and potentially fire 120) have been detected.

Figure 3:
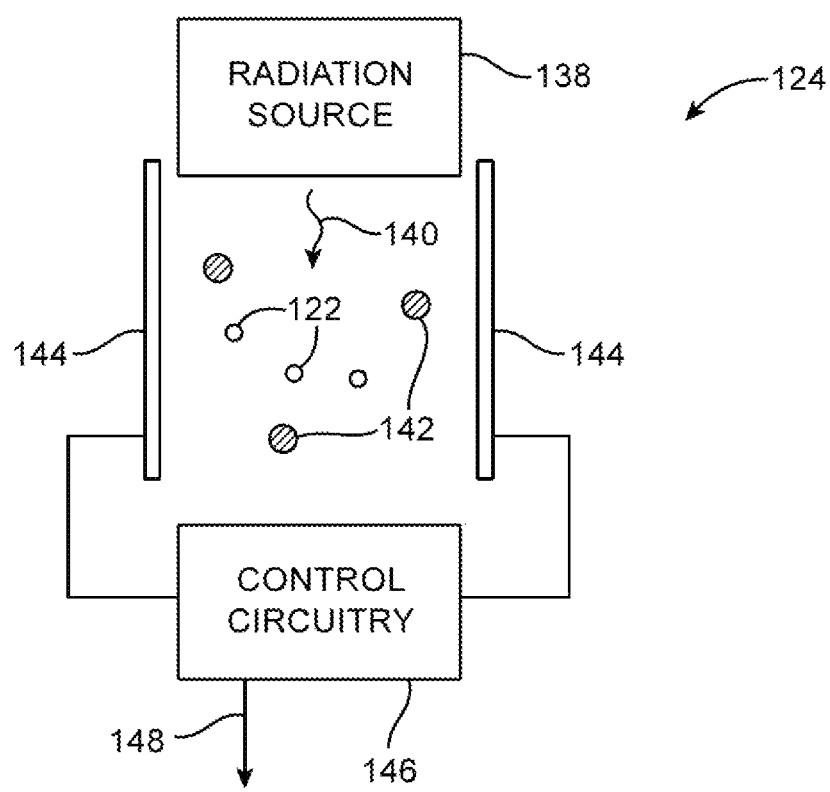
FIG. 3 is a diagram of an illustrative ionization smoke detector of the type that may be used in an electronic device in accordance with an embodiment of the present invention.

FIG. 3 is a diagram of an illustrative ionizing smoke detector. Smoke detector 124 of FIG. 3 has a radiation source such as radiation source 138 that emits ionizing radiation 140. Radiation 140 ionizes air molecules 142 between electrodes 144. Control circuitry 146 applies a voltage across electrodes 144. In the presence of ionized air molecules and in the absence of smoke 122, a current will flow between electrodes 144 and will be measured by control circuitry 146. When smoke 122 is present, the ionized air molecules are neutralized by smoke 122 so that the amount of current flow between electrodes 144 is significantly reduced. Control circuitry 146 can produce an output signal on path 148 that is indicative of the presence or absence of smoke (as an example).

If desired, other types of smoke detector such as pyroelectric detectors, infrared light detectors, image-sensor (camera) based detectors, and other smoke detector structures may be used in implementing smoke detectors 124. The configurations of FIGS. 2 and 3 are merely illustrative.

Electronic devices 10 of the type shown in FIGS. 4, 5, 6, 7, 8, and 9 and other electronic devices 10 may be provided with smoke detectors 124 and/or circuitry for issuing alerts to a user and/or taking other suitable action (e.g., issuing wired or wireless fire suppression equipment control commands for equipment 116 of FIG. 1 that direct equipment 116 to suppress fire 120). An electronic device that detects smoke may present a local alert to the user of that electronic device and may transmit alerts to one or more remote electronic devices. Alerts may include visual information, audio information, etc.

Figure 4:
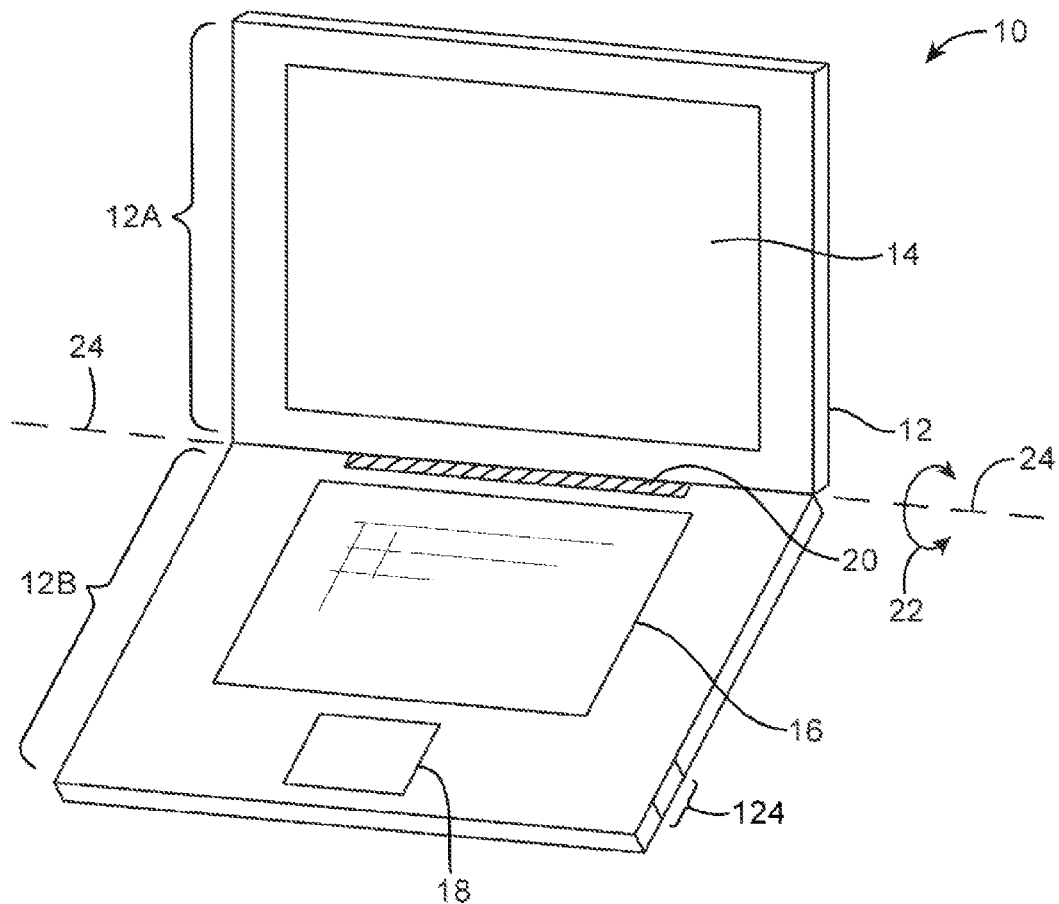
FIG. 4 is a perspective view of an illustrative electronic device such as a laptop computer of the type that may be provided with a smoke detector in accordance with an embodiment of the present invention.

Electronic device 10 of FIG. 4 has the shape of a laptop computer and has upper housing 12A and lower housing 12B with components such as keyboard 16 and touchpad 18. Device 10 has hinge structures 20 to allow upper housing 12A to rotate in directions 22 about rotational axis 24 relative to lower housing 12B. Display 14 is mounted in upper housing 12A. Upper housing 12A, which may sometimes referred to as a display housing or lid, is placed in a closed position by rotating upper housing 12A towards lower housing 12B about rotational axis 24. Smoke detector 124 may be mounted in a port that is located along the right hand edge of housing 12B (e.g., a connector port or other port) or may be located elsewhere in housing 12A or housing 12B.

Figure 5:
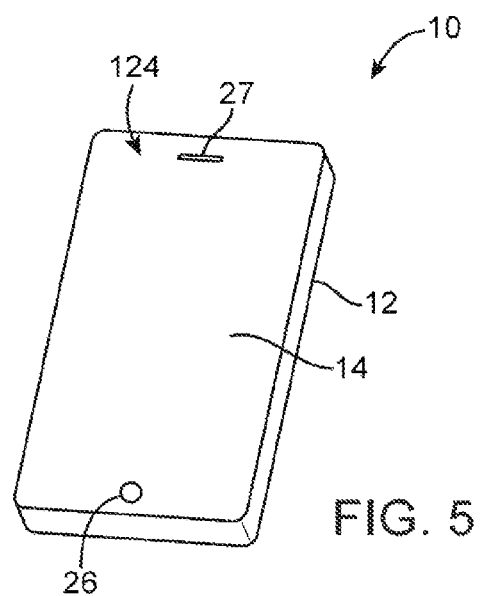
FIG. 5 is a perspective view of an illustrative electronic device such as a handheld electronic device of the type that may be provided with a smoke detector in accordance with an embodiment of the present invention.

FIG. 5 shows an illustrative configuration for electronic device 10 based on a handheld device such as a cellular telephone, music player, gaming device, navigation unit, or other compact device. In this type of configuration for device 10, housing 12 has opposing front and rear surfaces. Display 14 is mounted on a front face of housing 12. Display 14 may have an exterior layer that includes openings for components such as button 26 and speaker port 27. Smoke detector 124 may be located in speaker port 27 or elsewhere in device housing 12.

Figure 6:
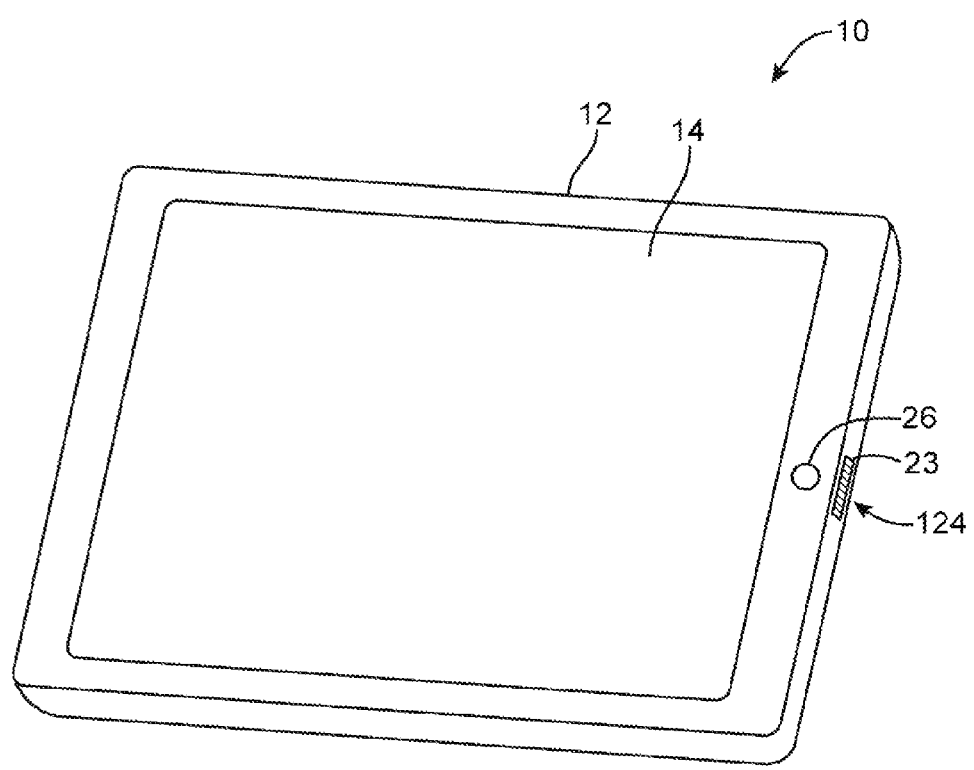
FIG. 6 is a perspective view of an illustrative electronic device such as a tablet computer of the type that may be provided with a smoke detector in accordance with an embodiment of the present invention.

In the example of FIG. 6, electronic device 10 is a tablet computer. In electronic device 10 of FIG. 6, housing 12 has opposing planar front and rear surfaces. Display 14 is mounted on the front surface of housing 12. As shown in FIG. 6, display 14 has an external layer with an opening to accommodate button 26. Smoke detector 124 may be located in port 23 (e.g., a connector or speaker port) or other opening in housing 12.

Figure 7:
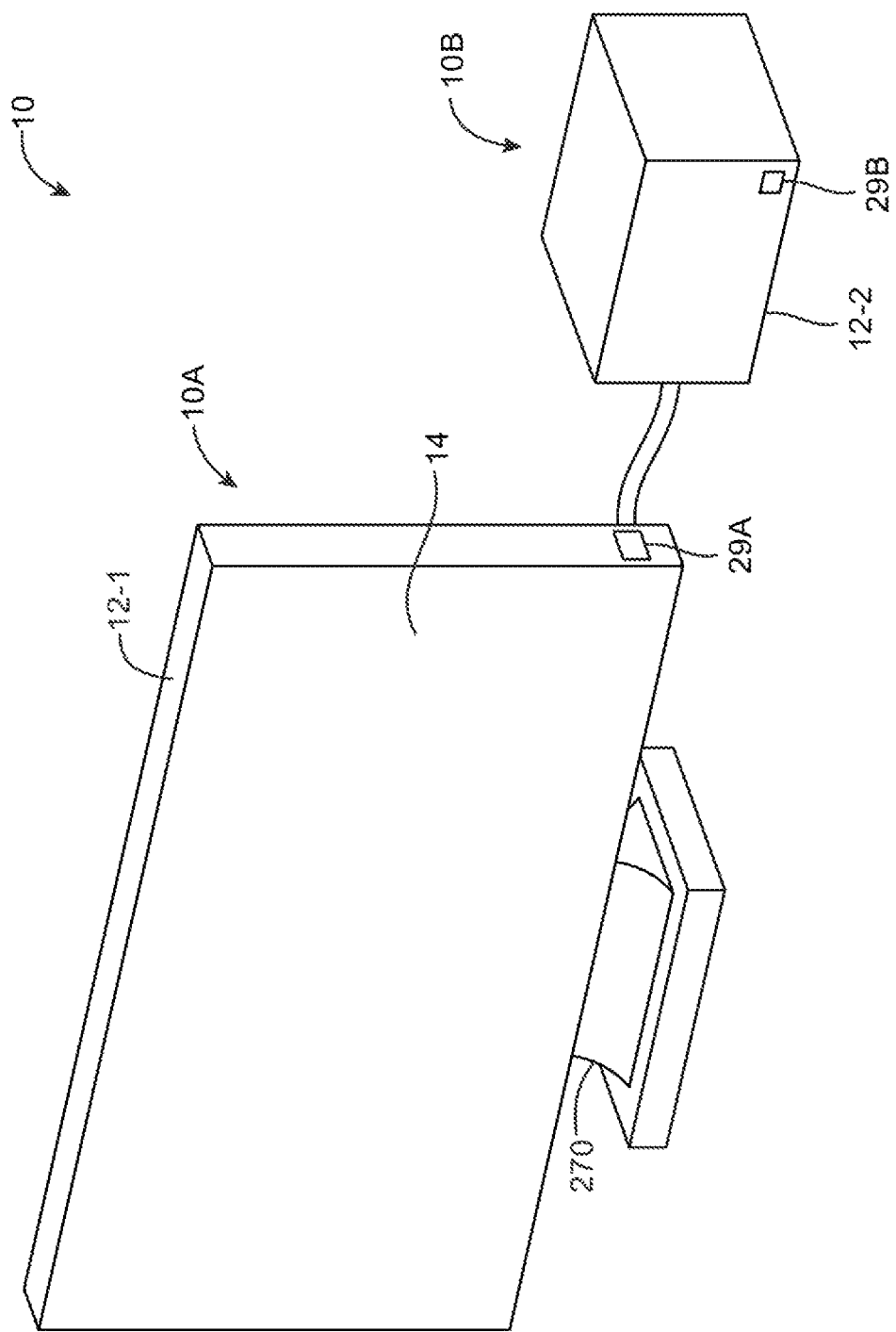
FIG. 7 is a perspective view of illustrative electronic devices such as a display and associated electronic equipment of the type that may be provided with a smoke detector in accordance with an embodiment of the present invention.

FIG. 7 shows an illustrative configuration for electronic device 10 in which device 10 includes an electronic device such as display device 10A and/or includes additional electronic device 10B. Device 10A may be a television, a computer monitor, or a computer that has been integrated into a computer display. Electronic device 10B may be a wired router, a wireless router, a storage device, a set-top box, a desktop computer, or other electronic equipment. Electronic device 10B may be coupled to accessories such as display 10A or may be used separately. As shown in FIG. 7, display 10A may have a housing 12-1 mounted on stand 270. Display 14 may be mounted on a front face of housing 12-1. Device 10B may have a housing such as housing 12-2. Smoke detectors such as smoke detector 124 may be mounted in ports such as port 29A of display device 10A and port 29B of device 10B. Ports 29A and 29B may be connector ports, speaker ports, or other housing openings.

Figure 8:
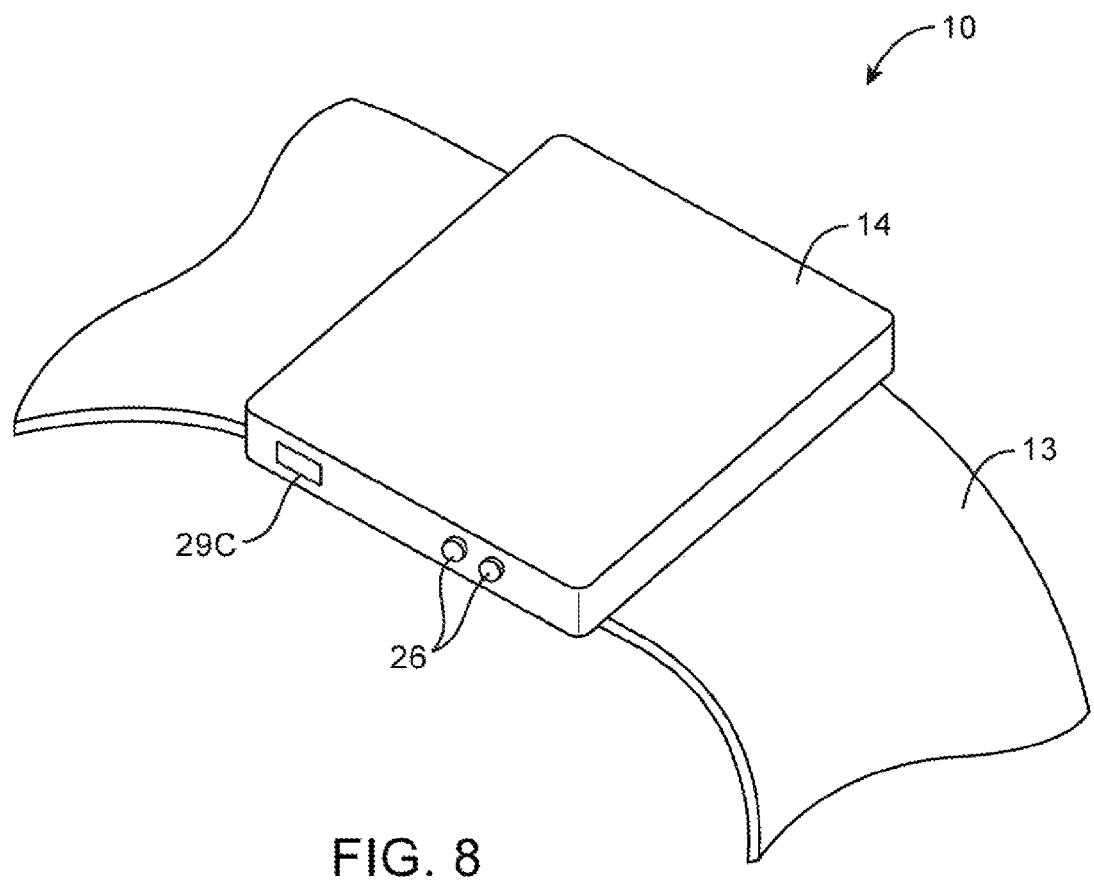
FIG. 8 is a perspective view of an illustrative wearable electronic device of the type that may be provided with a smoke detector in accordance with an embodiment of the present invention.

FIG. 8 shows an illustrative configuration for electronic device 10 in which device 10 is a wearable device such as a wristwatch device. Display 14 may be mounted on housing 12. Strap 13 may be coupled to housing 12 so that housing 12 and the rest of device 10 may be attached to the wrist or other body part of a user. Housing 12 may have openings to accommodate buttons 26 and openings to form ports such as port 29C. Port 29C may be, for example, a speaker port or a connector port. Smoke detector 124 may be mounted in port 29C.

Figure 9:
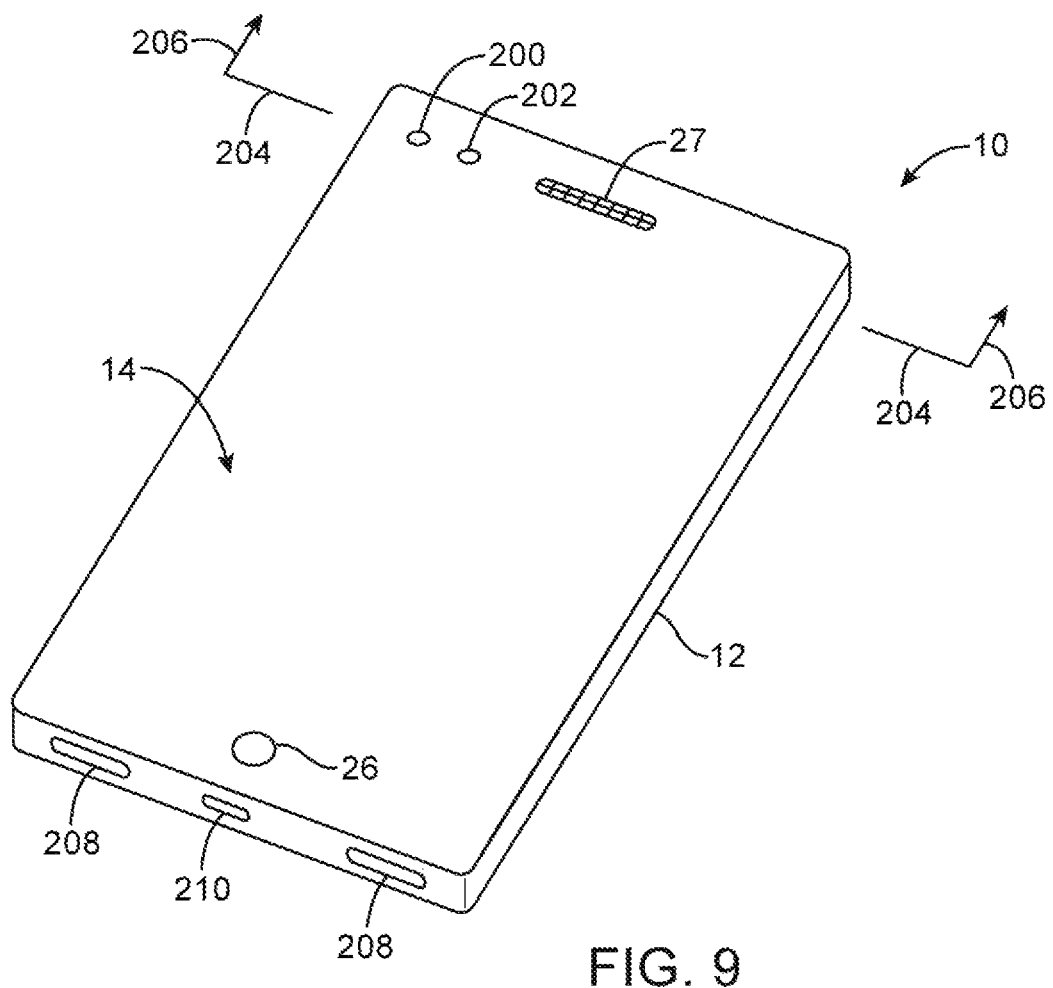
FIG. 9 is a perspective view of an illustrative electronic device having ports such as a speaker port in accordance with an embodiment of the present invention.

FIG. 9 is a perspective view of an illustrative handheld electronic device of the type that may be provided with smoke detector 124. Device 10 of FIG. 9 has a proximity sensor such as proximity sensor 202. Proximity sensor 202 may have an infrared light emitter such as an infrared light-emitting diode and may have an infrared detector that detects emitted infrared light from the infrared light emitter that has reflected from nearby objects. Camera 200 may have a lens and an image sensor for capturing image data. Camera 200 and proximity sensor 202 and other components in devices such as electronic device 10 may be used in monitoring the surroundings of device 10 and monitoring the usage of device 10. For example, sensor data and data from other circuitry in device 10 may be used in detecting smoke. Sensor data and other data from circuitry in device 10 may also be used in determining whether device 10 is actively being used by a user and/or whether the user is present in the vicinity of device 10 (e.g., by detecting user movement relative to device 10).

Openings may be formed in display 14 to accommodate buttons such as button 26 and speaker port 27. Openings may be formed in housing 12 to form connector ports such as connector port 210 and speaker and microphone ports 208. Smoke detector 124 may be mounted in connector port 210, ports 208, port 27, or other openings in device 10. As an example, smoke detector 124 may be mounted under the speaker mesh associated with speaker port 27.

Figure 10:
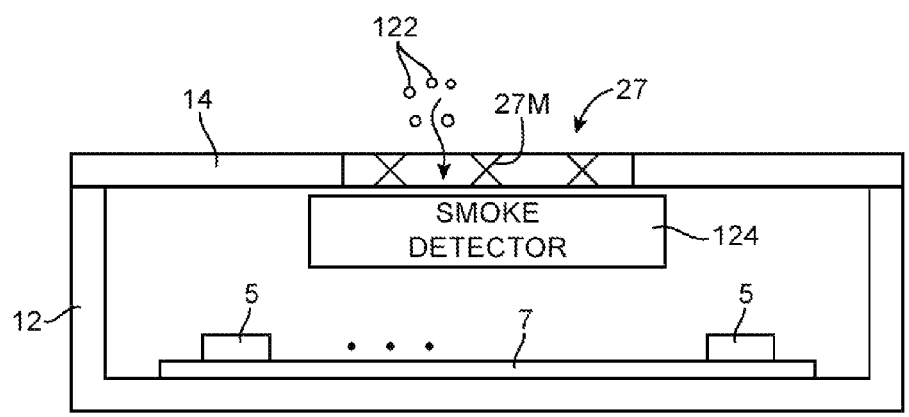
FIG. 10 is a cross-sectional side view of an illustrative electronic device of the type shown in FIG. 9 showing how a smoke detector may be mounted within a housing of the electronic device adjacent to a speaker grill in a speaker port in accordance with an embodiment of the present invention.

FIG. 10 is a cross-sectional side view of device 10 of FIG. 9 taken along path 204 and viewed in direction 206. As shown in FIG. 10, smoke detector 124 may be located under mesh 27M of speaker port 27. Device 10 may contain components 5 mounted on one or more substrates such as printed circuit 7 within the interior of housing 12. Smoke detector 124 may be mounted within the interior of device 10 under port 27 (e.g., on printed circuit 7, on a flexible printed circuit cable that is coupled to printed circuit 7, etc.). In the presence of smoke 122, smoke 122 can pass through openings within speaker mesh 27M and can be detected by smoke detector 124.

The illustrative configurations for device 10 that are shown in FIGS. 4, 5, 6, 7, 8, 9, and 10 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a television, a computer display that does not contain an embedded computer, a gaming device, a navigation device, a storage device, a router, an embedded system such as a system in which electronic equipment with a display is mounted in a kiosk or automobile, equipment that implements the functionality of two or more of these devices, or other electronic equipment.

Housing 12 of device 10, which is sometimes referred to as a case, is formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Figure 11:
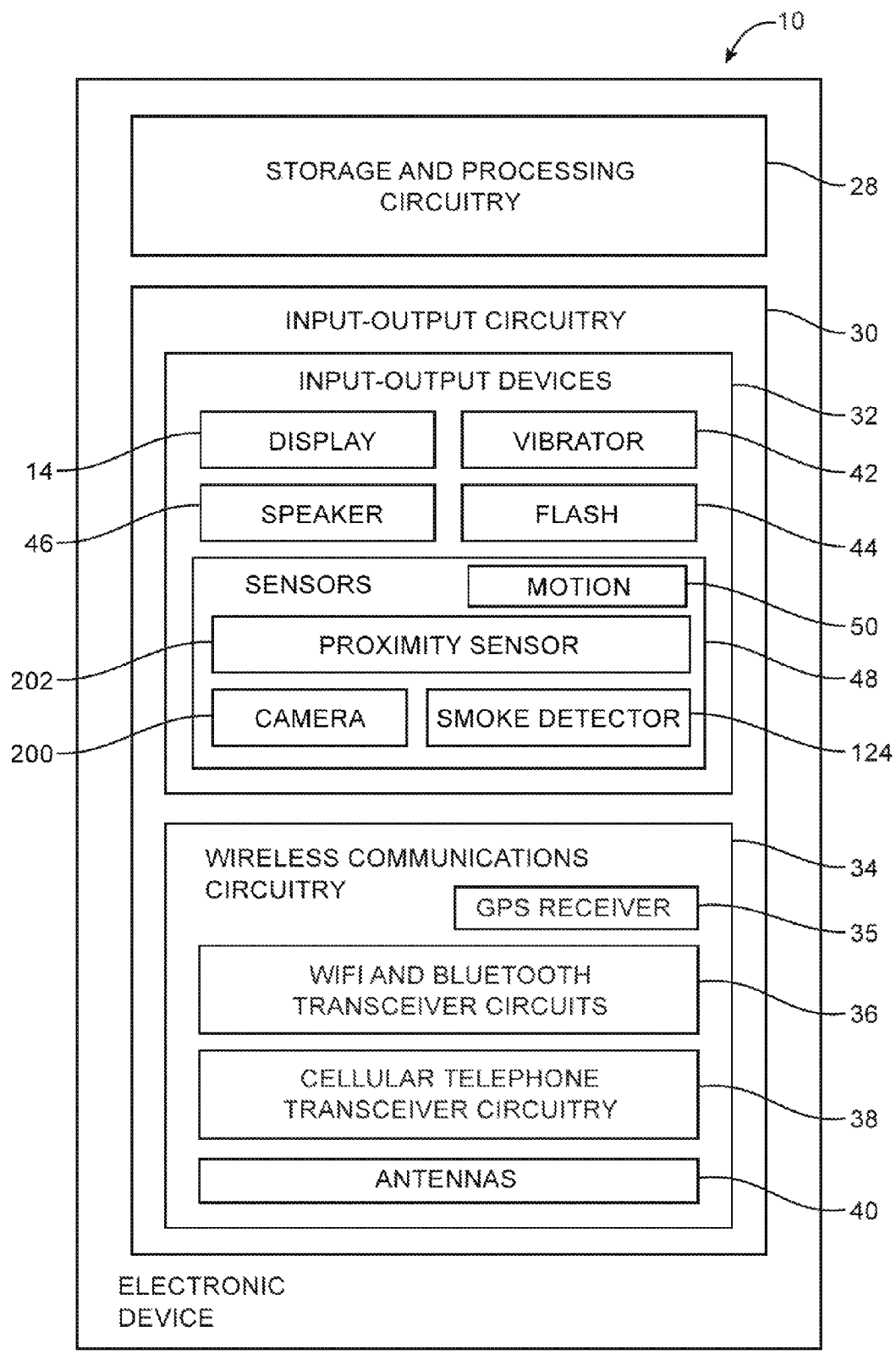
FIG. 11 is a schematic diagram of an illustrative electronic device in accordance with an embodiment of the present invention.

A schematic diagram of an illustrative configuration that may be used for electronic devices 10 of system 100 is shown in FIG. 11. As shown in FIG. 11, electronic device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. The processing circuitry may be based on one or more microprocessors, microcontrollers, digital signal processors, baseband processors, power management units, audio codec chips, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, etc.

Circuitry 28 may use components such as smoke detector 124 to detect the presence of smoke 122. In response to detection of smoke 122, control circuitry 28 may send an alert message (e.g., a text message, email message, social network message, web-based message, or other message) or may otherwise cause an alert to be presented to remote alert recipients, may issue local alerts (e.g., to the user of a device that detects smoke), may issue other alerts, may issue control commands wirelessly or over a wired path that direct fire suppression equipment 116 to extinguish a fire, or may take other suitable actions.

Input-output circuitry 30 may be used to allow data to be supplied to device 10 and to allow data to be provided from device 10 to external devices. Input-output circuitry 30 may include input-output devices 32 such as button 26, touch screens, joysticks, click wheels, scrolling wheels, touch pads, key pads, keyboards, light-emitting diodes and other status indicators, data ports, etc. Input-output devices 32 in circuitry 30 may include display 14, vibrator 42, speakers such as speaker 46, light-emitting components such as camera flash 44 (sometimes referred to as a strobe or light-emitting diode), a microphone and other audio components, and other input-output devices. Input-output devices 32 may also include sensors 48. Sensors 48 may include a microphone, an ambient light sensor, proximity sensor 202, an accelerometer, compass, gyroscope or other component(s) that serves as motion sensor 50, camera 200 or other image sensor device for capturing image data, and smoke detector 124.

During operation, a user can control the operation of device 10 by supplying commands through input-output devices 32 and may receive status information and other output from device 10 using the output resources of input-output devices 32 (e.g., visual information on display 14, vibrations from vibrator 42, sound from speaker 46, flashes of light from flash 44, etc.). This output may be used in alerting a user about the detection of smoke 122 by the user's device or the devices of other users and may alert the user to the possibility of a fire such as fire 120.

Wireless communications circuitry 34 may include radio-frequency (RF) transceiver circuitry formed from one or more integrated circuits, power amplifier circuitry, low-noise input amplifiers, passive RF components, one or more antennas, filters, duplexers, and other circuitry for handling RF wireless signals. Wireless signals can also be sent using light (e.g., using infrared communications).

Wireless communications circuitry 34 may include satellite navigation system receiver circuitry such as Global Positioning System (GPS) receiver circuitry 35 (e.g., for receiving satellite positioning signals at 1575 MHz) or satellite navigation system receiver circuitry associated with other satellite navigation systems. Wireless local area network transceiver circuitry such as transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in cellular telephone bands such as bands in frequency ranges of about 700 MHz to about 2700 MHz or bands at higher or lower frequencies. Wireless communications circuitry 34 can include circuitry for other short-range and long-range wireless links if desired. For example, wireless communications circuitry 34 may include wireless circuitry for receiving radio and television signals, paging circuits, etc. Near field communications may also be supported (e.g., at 13.56 MHz). In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may have antenna structures such as one or more antennas 40. Antenna structures 40 may be formed using any suitable antenna types (e.g., inverted-F antennas, etc.).

Figure 12:
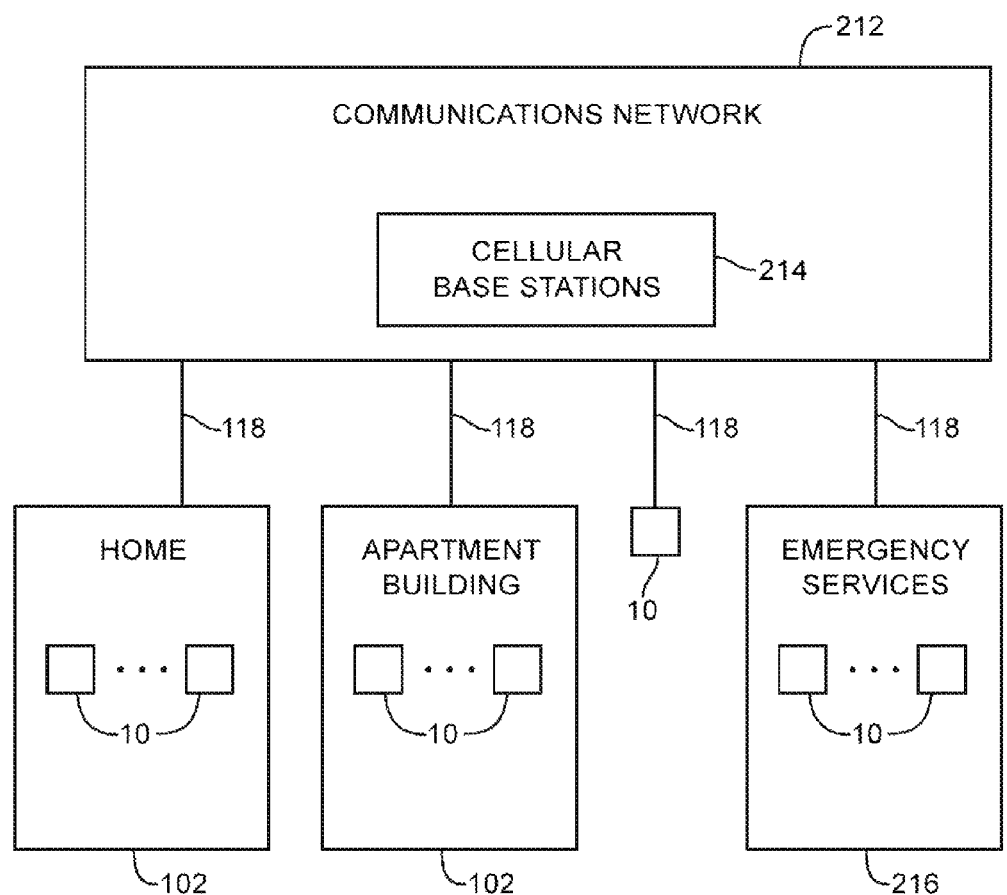
FIG. 12 is a system diagram of a network of electronic devices with smoke detection capabilities and alert generation capabilities in accordance with an embodiment of the present invention.

FIG. 12 is a diagram showing how electronic devices 10 may be used as part of a communications network. Electronic devices 10 may be located in buildings such as a residential building or a commercial building (e.g., a user's home such as a single family house, a multi-dwelling building such as an apartment building, etc.) or may be located outside of buildings (e.g., when a user of a portable electronic device is traveling on a public street or is otherwise located outside of a building with the electronic device). Electronic devices 10 may also be located in firehouses, police stations, the business establishments of security service vendors, or other emergency services structures.

As shown in FIG. 12, electronic devices 10 in buildings such as home 102 may be coupled to other electronic devices 10 in the network of FIG. 12 through communications network paths such as communications paths 118 and other communications paths in communications network 212. Network 212 may include local area networks, wide area networks, etc. Electronic devices 10 in apartment building 102 may be coupled to other electronic devices 10 in the network of FIG. 12 through communications network paths such as communications paths 118 and other communications paths in communications network 212. Electronic devices 10 at emergency services facility 216 may likewise be coupled to other electronic devices 10 in the network of FIG. 12 through communications network paths such as communications paths 118 and other communications paths in communications network 212. If users of electronic devices 10 such as wearable electronic devices, handheld electronic devices, and other portable electronic devices carry those electronic devices 10 into the field outside of any building, those electronic devices may be coupled to other electronic devices 10 in the network of FIG. 12 through communications network paths such as communications paths 118 (e.g., wireless links) and other communications paths in communications network 212.

Communications network 212 and its communications paths such as communications paths 118 may include wired and/or wireless communications paths (e.g., Ethernet links, wireless local area network paths such as wireless links in an IEEE 802.11 wireless local area network, cellular telephone wireless paths with wireless base station equipment such as cellular base stations 214, and other wired and wireless paths). Those electronic devices 10 that include smoke detector circuitry 124 may monitor their surroundings for the presence of smoke.

Electronic devices 10 may use information from sensors and other components to determine whether or not a user of an electronic device is present in the vicinity of an electronic device. For example, if a motion sensor detects motion of a device, it can be concluded that the device is being carried or otherwise handled by a user. As another example, if touch commands and button presses are being supplied to an electronic device, or if the electronic device is being used to conduct a telephone call or handle other user activity, it may be concluded that the user is present in the vicinity of an electronic device. Camera data and proximity sensor data may also be used to determine of a user is present in the vicinity of a device. Information from a satellite navigation system receiver and/or information from surrounding wireless local area networks may be used in determining the current location of the user's device. Information on the identity of the user of each device may be determined by ascertaining the owner of each device and/or the name of the user of a device who has actively logged into that device.

When smoke is detected by a smoke detector in a device 10, suitable action may be taken. For example, emergency services personnel at emergency services 216 may be notified, users of electronic equipment such as devices 10 may be presented with alerts, fire suppression equipment in the vicinity of the detected smoke may be activated, and other suitable action may be taken.

Alerts may be presented using output from input-output devices 32 of devices 10. As an example, alerts may be presented in the form of an audible tone, a vibration, a voice recording, a synthesized text-to-voice message, a visible output such as light from a light-emitting diode or a flashing camera strobe or other light source, a visible output such as images on a display (e.g., text, graphics, video, interactive prompts, etc.), or other suitable types of alerts. The content of an alert may inform the recipient of the alert about the nature of the detected smoke incident (e.g., incident location, the identity of nearby people, etc.), whether emergency services personnel have been notified, etc.

Figure 13:
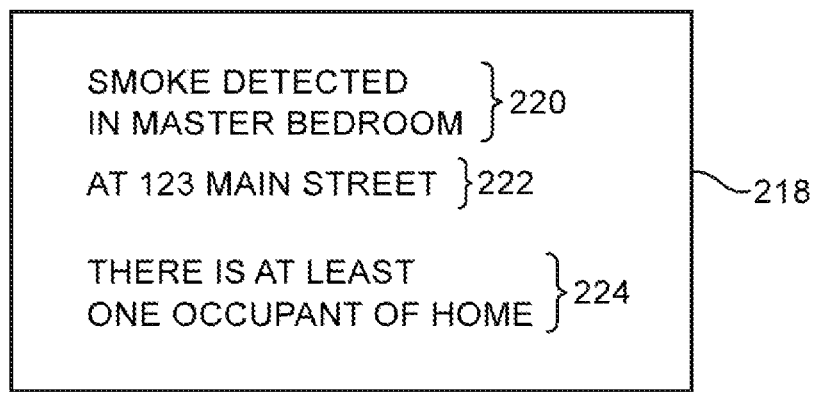
FIG. 13 shows an illustrative alert of the type that may be presented on an electronic device to alert emergency services personnel of the location and nature of an emergency in which smoke has been detected in accordance with an embodiment of the present invention.

FIG. 13 is a diagram of an illustrative alert of the type that may be provided to emergency services personnel (as an example). Alert 218 may be presented on an electronic device 10 at emergency services facility 216 (FIG. 12) in response to detection of smoke using the smoke detector of one of the electronic devices 10 at home 102 (FIG. 12). The device that detects the smoke may transmit alert 218 to devices 10 at emergency services facility 216 and other alert recipients using wired and/or wireless paths. As shown in FIG. 13, alert 218 may include information such as information 220 that informs the recipient of alert 218 that smoke has been detected in the vicinity of a device 10 with a smoke detector 124. Alert 218 may also contain information 222 such as a street address or other address information that identifies the location of the detected smoke. Information such as information 224 may specify whether there are any known occupants of the building containing the device that detected the smoke. For example, if an electronic device that is owned by a homeowner detects smoke at the home of the homeowner and if that electronic device (or other networked electronic device within the home) is being actively used within the home (indicating the presence of at least one home occupant) or detects a nearby occupant using a camera, proximity sensor, or other sensor, information 224 may specify that there is at least one known occupant of the home. When emergency services personnel respond to alert 218, they can attempt to locate and assist that home occupant.

Information on the status of home occupants can be gathered by each device 10 that is located within the home, may be gathered by one of devices 10 that serves as a coordinator device and that is coupled to other devices 10 via communications network 212, or may be gathered by other equipment. Information that may be used to determine whether a user of a device is currently present within a home includes information on the location of each device 10 (e.g., information gathered using satellite navigation signals, information on the known location of each device as supplied by users when setting up the devices and/or services such as home networking and smoke monitoring services) and information on whether devices that are known to be in the home are actively being used by a user (e.g., motion sensor data indicating that a wearable device is being worn and moved by a user, camera sensor data, proximity sensor data, ambient light sensor data, or other data indicating that a user is moving device 10 and/or is moving in the vicinity of device 10).

Alerts may be issued to people other than emergency services personnel. For example, alerts may be provided to the user of a device that has detected smoke, users of nearby devices, users of other devices that are located in the same building in which the device that has detected the smoke is located, users of devices that are within a given distance of the building in which the smoke was detected, homeowners, families of homeowners, friends and relatives of the homeowner, and other parties who are associated with the homeowner who are interested in learning about the detected smoke. Alert recipients such as occupants of the building in which the smoke was detected will benefit by receiving a warning about the presence of smoke that allows them to safely leave the building. Homeowners and other interested parties who are not present in the immediate vicinity of the home or other building in which the smoke was detected can benefit from being alerted that the home or other building is potentially not safe and should be avoided until the situation has been resolved.

Figure 14:
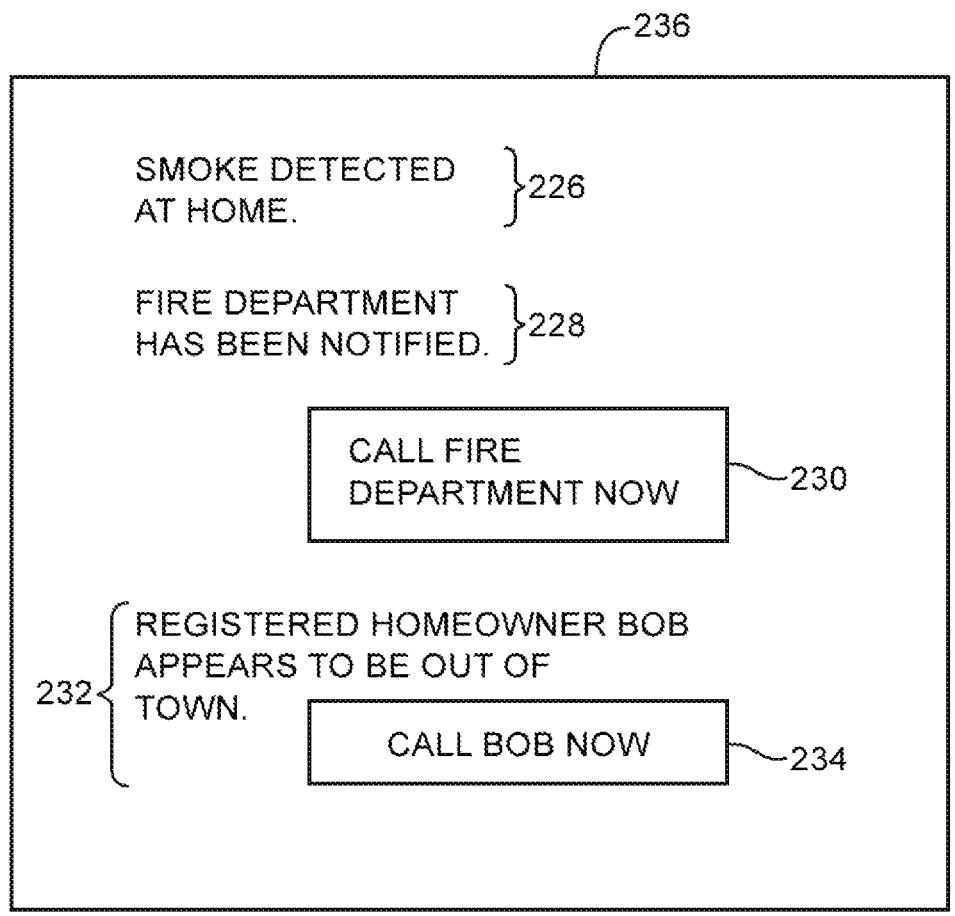
FIG. 14 shows an illustrative alert of the type that may be presented on an electronic device to alert a homeowner or others about an emergency in which smoke has been detected in accordance with an embodiment of the present invention.

FIG. 14 is a diagram of an illustrative alert of the type that may be provided to users of devices 10 such as users of devices 10 in the building in which the smoke has been detected (e.g., occupants in various different rooms of a house and/or occupants of apartments within an apartment building) or that may be provided to users outside of the building in which the smoke has been detected (e.g., nearby users such as users in adjacent homes and/or distant users such as the homeowner and other residents of the home that are not currently present within the home). As shown in FIG. 14, alert 236 may include information 226 that informs recipients of alert 236 of the location at which smoke has been detected by a smoke detector in one of devices 10. Alert 236 may also include information such as information 228 that informs recipients of the alert of whether or not the fire department, police department, or other emergency services providers have been contacted. Information 228 may help prevent situations in which numerous duplicative reports are made of a fire, thereby reducing the burden on emergency services.

Alerts such as alert 236 may include interactive prompts. The interactive prompts may be selected by a user (e.g., by clicking on the prompt using a mouse and cursor, by touching the prompt in a touch screen environment, by issuing an appropriate voice command in a voice control input-output environment, etc.). In the example of FIG. 14, interactive prompt 230 contains a label such as "call fire department now". If the recipient of alert 236 needs to contact the fire department (e.g., to discuss the nature of the detected smoke and to provide updates on the situation), the recipient can select the interactive prompt. In response to selection of interactive prompt 230, the device 10 that is displaying prompt 230 can place a telephone call to the fire department or other emergency services.

Alert 236 may, if desired, include information 232 about people associated with the building in which the smoke was detected (e.g., the name and contact information of the homeowner, the name and contact information of the residents of the home or other building, the name and contact information of a property manager or other designated contact person, etc.). One or more associated interactive prompts may also be provided. For example, alert 236 may contain an interactive prompt such as interactive prompt 234 that provides an opportunity for a recipient of alert 236 to contact an appropriate contact person such as the homeowner of the home or other building in which the smoke has been detected (as an example).

Alerts can contain graphics, video, moving image content, text, photographic images, graphic (visual) representations of buildings, and other visual content. In the illustrative configuration of FIG. 15, alert 238 contains a graphic representation of the home in which the smoke has been detected (i.e., graphic home representation 240). Home representation 240 may include rooms such as rooms 108 and room name labels such as room name labels 244. Home representation 240 may also include information on the location at which the smoke has been detected by one of devices 10.

Figure 15:
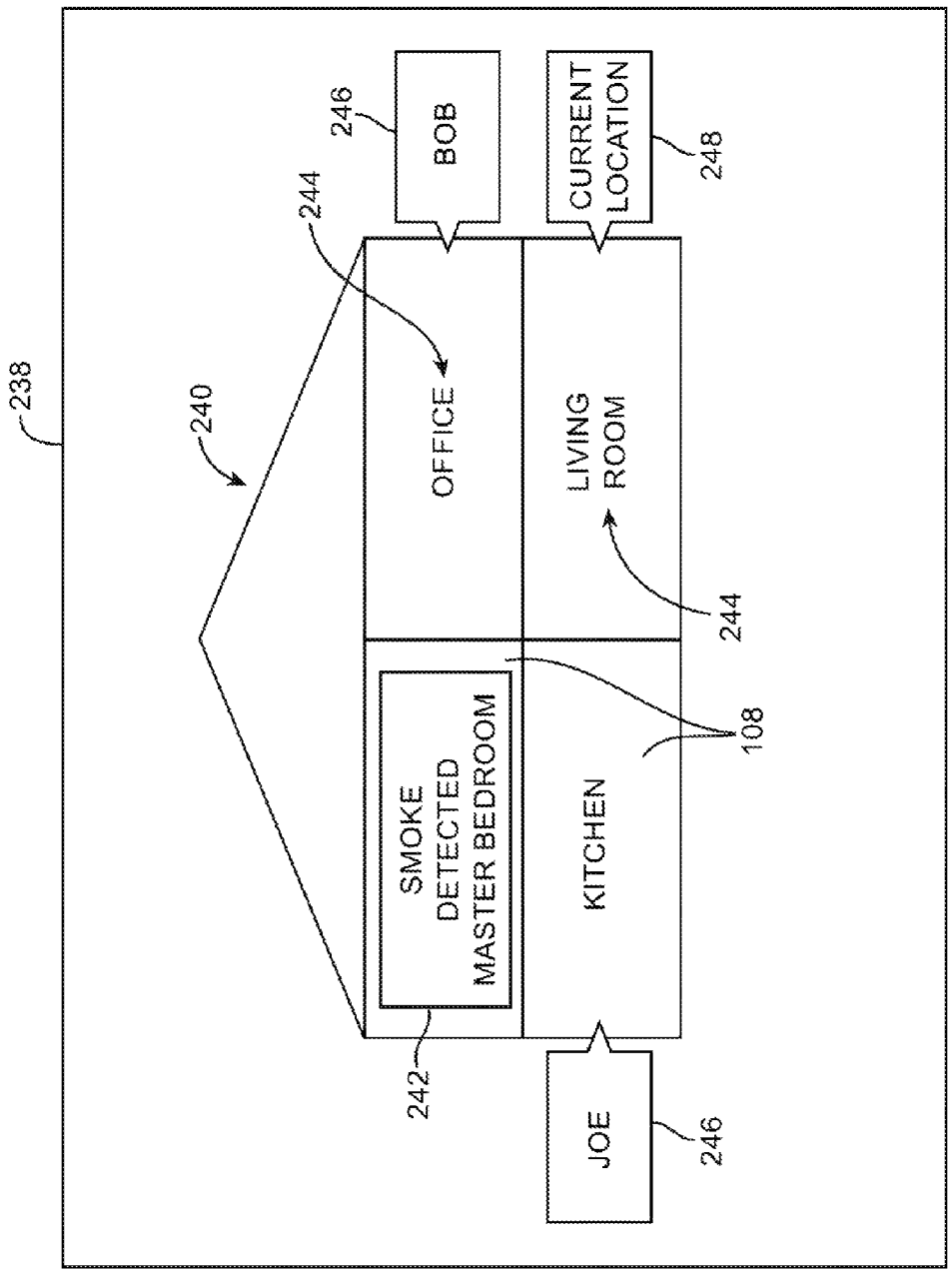
FIG. 15 shows an illustrative visual alert of the type that may be presented on an electronic device to visually inform a homeowner or others about the nature of an emergency in which smoke has been detected and the location of known occupants of the home relative to the location of detected smoke in accordance with an embodiment of the present invention.

In the example of FIG. 15, information 242 is being presented to inform the recipient of alert 238 of the location where smoke has been detected. Smoke location information 242 may be visually presented on graphic home representation 240 in a location that represents the location of the room that contains smoke (i.e., in the upper left room 108 of FIG. 15) and/or may contain text or other information that labels the location of the detected smoke (e.g., "master bedroom").

The user's current location 248 may be displayed in alert 238 (e.g., using a "current location" label that is located at the position within graphic representation 240 that corresponds to the alert recipient's current location). Labels such as occupant location labels 246 may also be provided to identify the locations of other occupants of the building. Labels 246 may indicate the location of the occupants visually by virtue of the position of each label 246 on graphic home representation 240 and/or with text. If desired, labels such as labels 246 may contain information on the name of the building occupants, as shown in the FIG. 15 example.

Figure 16:
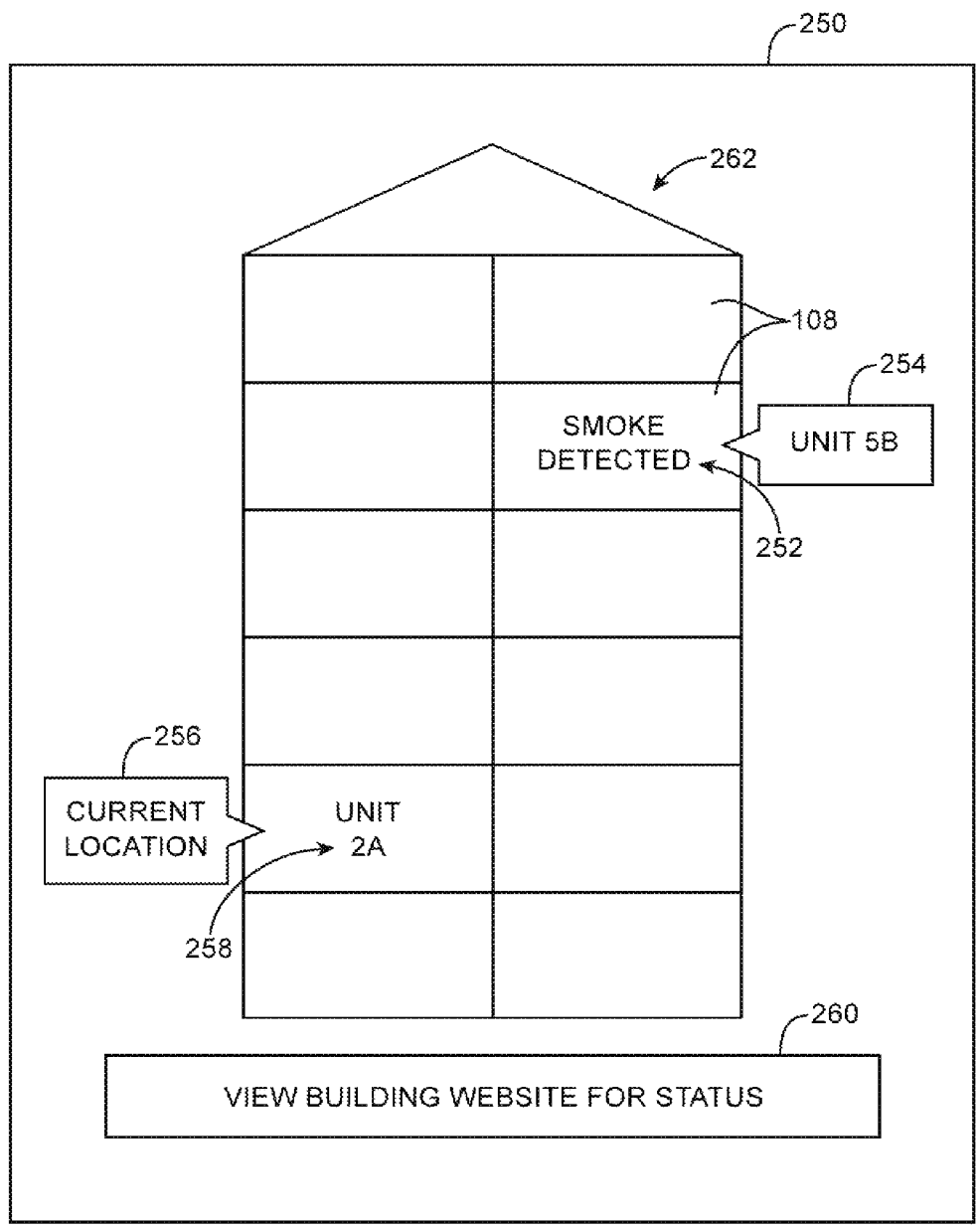
FIG. 16 shows an illustrative visual alert of the type that may be presented on an electronic device to visually inform a building occupant such as an apartment dweller or others about the nature of an emergency in which smoke has been detected and the location of known occupants of the building relative to the location of detected smoke and the alerted building occupant in accordance with an embodiment of the present invention.

In the illustrative configuration of FIG. 16, alert 250 contains a graphic representation of an apartment building in which the smoke has been detected (i.e., graphic building representation 262). Graphic building representation 262 may include a visual representation of rooms such as rooms 108 (e.g., apartments). Labels such as label 252 may indicate visually and with text that smoke has been detected and where the detected smoke is located. Labels such as label 254 may provide the apartment number of the apartment in which the smoke has been detected. Apartment number (apartment unit) label 258 and label 256 may be used to graphically and textually identify the location of the recipient of alert 250 within the apartment building. Using this information, the recipient can determine whether the detected smoke is near to the recipient's current location and can take appropriate action (e.g., by leaving the building). Interactive prompts such as selectable onscreen option 260 may be provided in alert 250. Option 260 and other interactive prompts may be selected when an alert recipient desires more information on the detected smoke. In the example of FIG. 16, option 260 provides an alert recipient with an opportunity to be taken to a website associated with the apartment building that is visually represented by graphic building representation 262. In general, interactive prompts may be used to provide the alert recipient with additional information on the smoke detection event from any suitable party (e.g., a web server associated with an emergency services organization, etc.).

Figure 17:
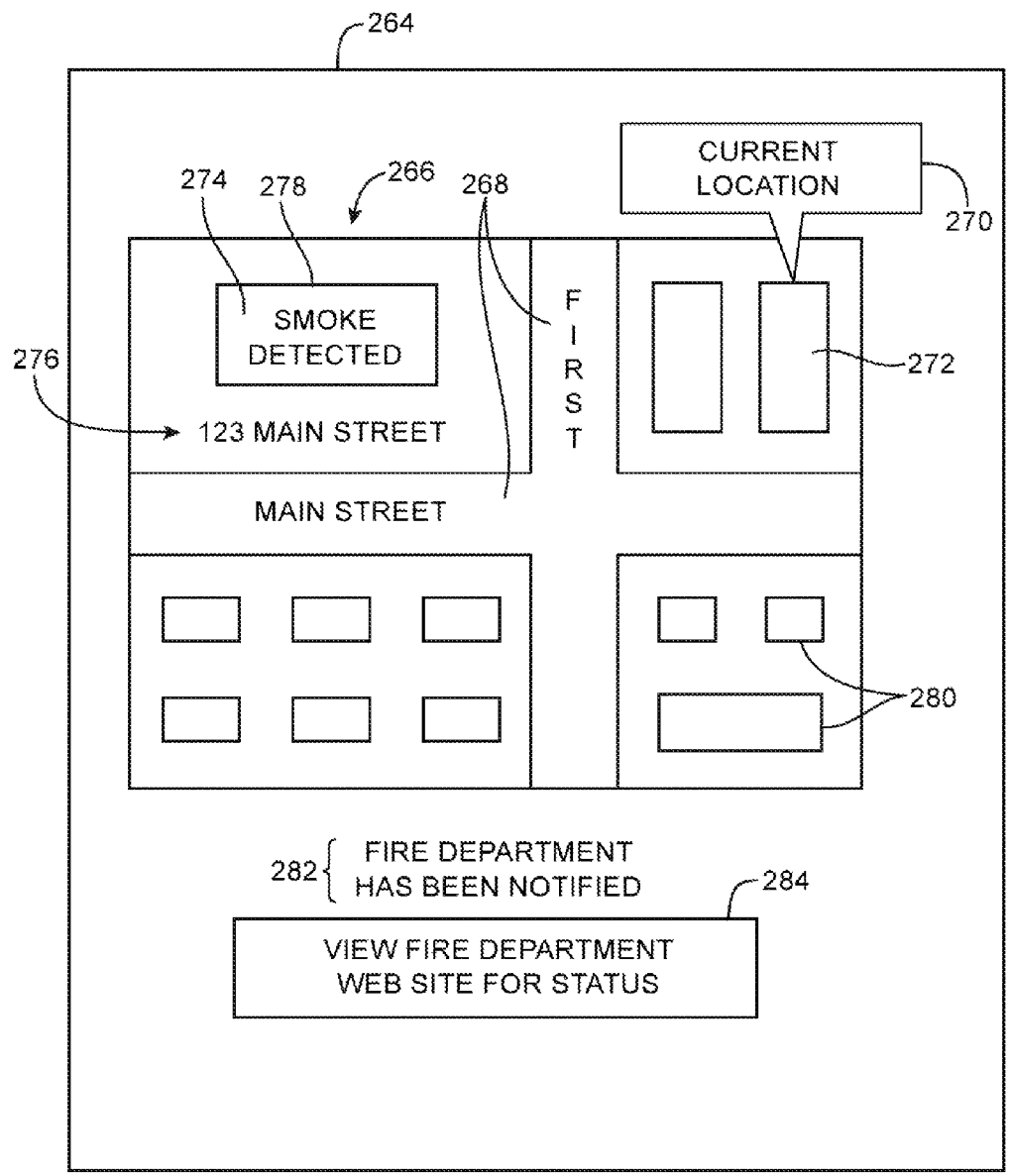
FIG. 17 shows an illustrative map-based alert of the type that may be presented on electronic devices to visually alert neighbors and other members of the public in the vicinity of a home in which smoke has been detected in accordance with an embodiment of the present invention.

In the example of FIG. 17, an alert recipient at a device 10 has been provided with visual alert 264. Alert 264 may contain a map such as map 266 or other graphic information that visually indicates the geographic location of the detected smoke relative to the alert recipient's current location and other points of interest. Map 266 may include graphic depictions of buildings such as buildings 280, streets such as streets 268, and other geographic (map) points of interest. In the FIG. 17 example, map 266 includes information on the location at which the smoke has been detected by one of devices 10 such as "smoke detected" label 278. Text 274 in label 278 may be used to inform the alert recipient that smoke has been detected. Label 278 may be placed on map 266 at a location that represents the geographic location of the detected smoke. Address information 276 may also be provided in alert 264 to indicate where the smoke has been detected.

The alert recipient's current location (building 272 in the FIG. 17 example) may be highlighted using a current location label such as label 270. Information such as information 282 on the status of emergency services alerts (i.e., whether alerts have or have not been provided to the fire department or other emergency services) may be provided in alert 264. Alert 264 may also contain selectable on-screen options such as interactive prompt 284. A recipient of alert 264 (i.e., the user of the electronic device on which alert 264 is being displayed) may select option 284 to view the web site of the fire department or other emergency services online information (e.g., to obtain supplemental information on the detected smoke event).

Figure 18:
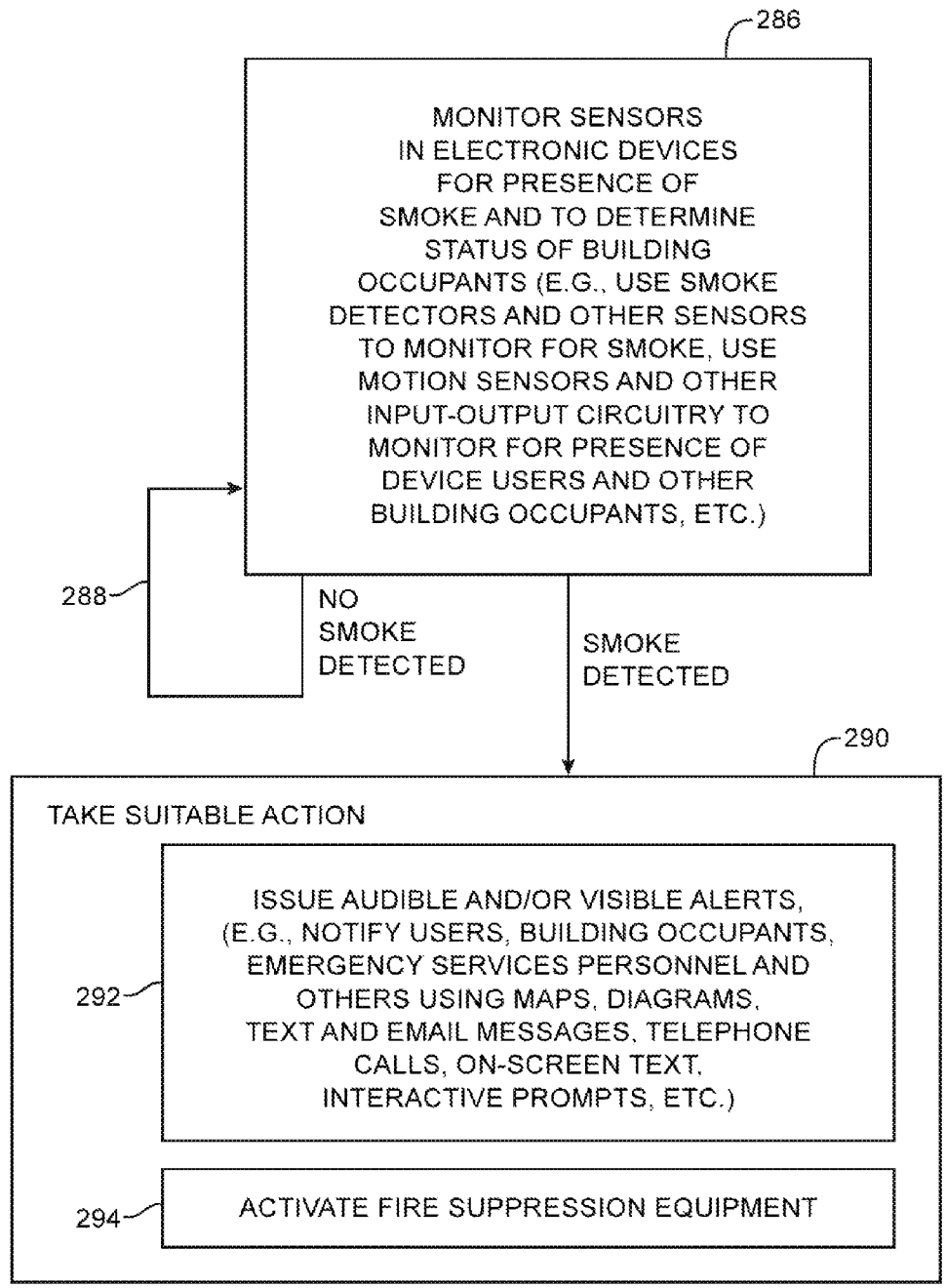
FIG. 18 is a flow chart of illustrative steps involved in using electronic devices in a network of electronic devices to monitor for the presence of smoke and in using the electronic devices to issue alerts or take other actions in response to detected smoke in accordance with an embodiment of the present invention.

FIG. 18 is a flow chart of illustrative steps involved in using electronic devices 10 to detect smoke and to take appropriate action in response to the detected smoke. At step 286, one or more electronic devices 10 may be used in monitoring for the presence of smoke and in determining what action should be taken in response to detecting smoke.

Smoke may be detected by devices 10 during step 286 using smoke detectors 124. In the event that smoke is not detected, devices 10 may continue to monitor for the presence of smoke, as shown by line 288.

During the operations of step 286, electronic devices 10 may gather sensor data and information from input-output devices and other circuitry in device 10 (e.g., control circuitry 28) to determine which electronic devices are being used. Examples of data that may be gathered to determine whether or not a device is being used include motion sensor data (e.g., to determine whether or not the motion of an electronic device is sufficient to indicate that the electronic device is being carried by a user), information from the touch sensor in the touch pad or touch screen of device 10, information from a keyboard, buttons, or other mechanically actuated structures that are used by a user, temperature sensor data to indicate the presence of a user body part, camera sensor data to visually detect movement of the user near the device, infrared temperature sensor data that indicates whether or not a user is nearby and emitting heat, a proximity sensor to detect whether or not a user's hand or other body part is near to the device, data from a satellite navigation system indicating whether the device is being moved, information from sensors (e.g., motion sensors) such as a gyroscope or compass to detect device movement, etc. Information on whether users are present and operating devices 10 may be used in identifying occupants of a building.

Devices 10 may also gather information on the identity of any users that are present. For example, devices 10 may determine the usernames of users who have logged into devices 10, may determine the names of the owners of each device 10, etc. User identity information may be used in labeling the content in alerts. Location information for each device 10 may be gathered using satellite navigation system receiver 35, information from wireless local area network base stations, etc.

In response to detecting smoke with one of devices 10, the detecting device 10 may be used in taking suitable action at step 290. The device 10 that detects the smoke may, for example, use wireless communications circuitry 34 or wired communications circuitry to transmit alert information, commands, or other data to external electronic equipment such as other devices 10. Device 10 may, for example, issue commands that direct fire suppression equipment 116 to suppress fire (step 294). As shown by step 292, the device 10 that detects the smoke (sometimes referred to as the transmitting device) may also send text messages, send email messages, send visible and/or audio alerts to other devices 10 such as devices associated with other occupants of the building in which the smoke was detected, the homeowner and others who may not be present in the home, but who are interested parties, neighbors, emergency services personnel, and other device users. Alerts may be presented in the form of audio played back on receiving devices 10, in the form of vibrations, in the form of alerts presented visually on displays 14 in devices 10, or other suitable formats.

The foregoing is merely illustrative of the principles of this invention and various modifications can be made by those skilled in the art without departing from the scope and spirit of the invention.

What is claimed is:

1. A cellular telephone, comprising:
    a housing;
    a display within the housing;
    a port; and
    a detector, wherein the detector is configured to monitor for particles through the port.

2. The cellular telephone defined in claim 1, further comprising:
    control circuitry, wherein the detector is coupled to the control circuitry.

3. The cellular telephone defined in claim 1, wherein the detector is mounted in the port.

4. The cellular telephone defined in claim 1, wherein the display comprises a touch screen display.

5. The cellular telephone defined in claim 1, wherein the detector comprises a light source and a light detector.

6. The cellular telephone defined in claim 1, wherein the detector comprises an ionizing detector.

7. The cellular telephone defined in claim 1, further comprising:
    communications circuitry configured to transmit data to external equipment in response to detecting particles with the detector.

8. The cellular telephone defined in claim 7, wherein the communications circuitry comprises wireless communications circuitry.

9. The cellular telephone defined in claim 7, further comprising satellite navigation system receiver circuitry configured to receive signals to determine the location of the cellular telephone.

10. The cellular telephone defined in claim 1, further comprising a motion sensor and a proximity sensor.

11. A cellular telephone, comprising:
    a housing;
    a display within the housing;
    an opening; and
    a detector, wherein the detector is configured to monitor for particles through the opening.

12. The cellular telephone defined in claim 11, further comprising mesh, wherein the opening is covered with the mesh.

13. The cellular telephone defined in claim 12, wherein the detector is configured to monitor for particles through the mesh.

14. The cellular telephone defined in claim 12, wherein the detector is located under the mesh.

15. A tablet computer, comprising:
    a housing;
    a display within the housing;
    a port; and
    a detector, wherein the detector is configured to monitor for particles through the port.

16. The tablet computer defined in claim 15, further comprising:
    control circuitry, wherein the detector is coupled to the control circuitry.

17. The tablet computer defined in claim 15, wherein the detector is mounted in the port.

18. The tablet computer defined in claim 15, wherein the display comprises a touch screen display.

19. The tablet computer defined in claim 15, wherein the detector comprises a light source and a light detector.

20. The tablet computer defined in claim 15, wherein the detector comprises an ionizing detector.

* * * * *